US010552284B2

(12) United States Patent
Skandakumaran et al.

(10) Patent No.: US 10,552,284 B2
(45) Date of Patent: Feb. 4, 2020

(54) SYSTEM AND METHOD FOR CONTROLLING PCIE DIRECT ATTACHED NONVOLATILE MEMORY STORAGE SUBSYSTEMS

(71) Applicant: Western Digital Technologies, Inc., Irvine, CA (US)

(72) Inventors: Krishanth Skandakumaran, Los Gatos, CA (US); Arun Kumar Medapati, Andhra Pradesh (IN); Sri Rama Namala, San Jose, CA (US); Ashwin Narasimha, Sunnyvale, CA (US); Ajith Kumar B, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 89 days.

(21) Appl. No.: 15/478,155

(22) Filed: Apr. 3, 2017

(65) Prior Publication Data
US 2017/0206150 A1 Jul. 20, 2017

Related U.S. Application Data

(63) Continuation of application No. 14/493,567, filed on Sep. 23, 2014, now Pat. No. 9,612,763.

(51) Int. Cl.
*G06F 11/30* (2006.01)
*G06F 1/32* (2019.01)
(Continued)

(52) U.S. Cl.
CPC .......... *G06F 11/3037* (2013.01); *G06F 1/329* (2013.01); *G06F 1/3225* (2013.01);
(Continued)

(58) Field of Classification Search
CPC .. G06F 11/3037; G06F 1/3225; G06F 1/3253; G06F 1/3268; G06F 1/329;
(Continued)

(56) References Cited

U.S. PATENT DOCUMENTS 7,702,931 B2 4/2010 Goodrum et al.
8,386,818 B2 2/2013 Hong
(Continued)

OTHER PUBLICATIONS

Intersil, "ISL3116: Dual Slot PCI-Express Power Controller," retrieved on Sep. 4, 2015 from <http://www.intersil.com/content/intersil/en/products/power-management/hot-plug-and-oring/hot-swap-hot-plug-pcibus-/ISL6112.html>, 1 page, Date Unknown.

*Primary Examiner* — Stefan Stoynov
(74) *Attorney, Agent, or Firm* — Morgan, Lewis & Bockius LLP

(57) ABSTRACT

Techniques for controlling power on a PCIe direct attached non-volatile memory storage system are disclosed. In one particular embodiment, the techniques may be realized as a method for controlling power including providing power to a memory attached via the PCIe interface; monitoring a state of the attached memory; determining whether a new operation to be implemented on the attached memory would cause the power provided to the memory to exceed a preset threshold; and stalling execution of the new operation on the attached memory when it is determined that the new operation would exceed the preset threshold while continuing execution of preexisting operations on the attached memory.

20 Claims, 9 Drawing Sheets

(51) Int. Cl.
  *G06F 3/06*     (2006.01)
  *G06F 11/34*    (2006.01)
  *G06F 13/42*    (2006.01)
  *G06F 1/3234*   (2019.01)
  *G06F 1/3225*   (2019.01)
  *G06F 1/329*    (2019.01)

(52) U.S. Cl.
  CPC .......... *G06F 1/3253* (2013.01); *G06F 1/3268* (2013.01); *G06F 3/0625* (2013.01); *G06F 11/3041* (2013.01); *G06F 11/3062* (2013.01); *G06F 11/3495* (2013.01); *G06F 13/4282* (2013.01)

(58) Field of Classification Search
  CPC ............... G06F 3/0625; G06F 11/3041; G06F 11/3062; G06F 11/3495; G06F 13/4282
  See application file for complete search history.

(56) References Cited

U.S. PATENT DOCUMENTS

| | | |
|---|---|---|
| 8,694,719 B2 | 4/2014 | Lassa et al. |
| 8,745,369 B2 | 6/2014 | Yurzola et al. |
| 9,152,568 B1 | 10/2015 | Seigler et al. |
| 9,436,782 B2 | 9/2016 | Kuramoto |
| 9,612,763 B2 | 4/2017 | Skandakumaran et al. |
| 2004/0267984 A1 | 12/2004 | Fukushima et al. |
| 2005/0228900 A1 | 10/2005 | Stuart et al. |
| 2007/0140030 A1 | 6/2007 | Wyatt |
| 2007/0191993 A1 | 8/2007 | Wyatt |
| 2008/0062873 A1 | 3/2008 | Semrad et al. |
| 2009/0006708 A1 | 1/2009 | Lim |
| 2009/0049449 A1 | 2/2009 | Varadarajan |
| 2009/0052266 A1 | 2/2009 | Askar et al. |
| 2009/0154456 A1 | 6/2009 | Dodson et al. |
| 2009/0172444 A1 | 7/2009 | Wang et al. |
| 2011/0107037 A1 | 5/2011 | Yoshida |
| 2012/0075992 A1 | 3/2012 | Shahidi et al. |
| 2013/0166809 A1 | 6/2013 | Xiao et al. |
| 2014/0032939 A1 | 1/2014 | Jeddeloh |
| 2014/0067139 A1 | 3/2014 | Berke et al. |
| 2014/0086000 A1 | 3/2014 | Datla |
| 2014/0136827 A1 | 5/2014 | Cho et al. |
| 2016/0077961 A1 | 3/2016 | Erez et al. |
| 2016/0085290 A1 | 3/2016 | Skandakumaran et al. |
| 2016/0085458 A1 | 3/2016 | Skandakumaran et al. |

SYSTEM AND METHOD FOR CONTROLLING PCIE DIRECT ATTACHED NONVOLATILE MEMORY STORAGE SUBSYSTEMS

CROSS-REFERENCE TO RELATED APPLICATIONS

The present application claims the benefit of priority under 35 U.S.C. § 120 as a continuation of U.S. patent application Ser. No. 14/493,567 entitled "Apparatus and Methods to Control Power on PCIe Direct Attached Nonvolatile Memory Storage Subsystems," filed on Sep. 23, 2014, which has issued as U.S. Pat. No. 9,612,763 on Apr. 3, 2017, the disclosures of which are hereby incorporated by reference in their entirety for all purposes.

BACKGROUND

Non-volatile memory storage systems are a type of memory commonly used in computer systems. Non-volatile memory such as solid state drives and hard drives provide particular benefits including, for example, the ability to store data with high data access and throughput rates. Recently, systems that connect non-volatile memory directly to a Peripheral Component Interconnect Express (PCIe) interface have been developed. In some instances, a non-volatile memory card may connect directly to a PCIe interface without an additional controller (e.g., SATA controller) there between.

Power is supplied to the memory via the PCIe interface. However, a PCIe interface is limited in the amount of power that may be safely supplied to the memory. In addition, various operations performed on the memory may consume more power than can be safely provided by the PCIe interface. Traditional methods of controlling power to PCIe direct attached non-volatile memory simply cut off the power or shut down the attached computer system if an attached memory attempts to go over a power limit. The traditional techniques, however, may negatively impact the performance of the overall system by not actively managing power consumption of the attached non-volatile memory.

In view of the foregoing, it may be understood that there may be significant problems and shortcomings associated with current technologies for controlling power on PCIe direct attached non-volatile memory storage systems.

SUMMARY OF THE DISCLOSURE

Techniques for controlling power on PCIe direct attached nonvolatile memory storage subsystems are disclosed. In some embodiments, the techniques may be realized as a method for controlling power on PCIe direct attached non-volatile memory storage subsystems including providing power to a memory attached via the PCIe interface; monitoring a state of the attached memory; determining whether a new operation to be implemented on the attached memory would cause the power provided to the memory to exceed a preset threshold; and stalling execution of the new operation on the attached memory when it is determined that the new operation would exceed the preset threshold while continuing execution of preexisting operations on the attached memory.

In accordance with additional aspects of this embodiment, the attached memory is a directly attached non-volatile memory storage system.

In accordance with further aspects of this embodiment, the non-volatile memory storage system may be a solid state drive.

In accordance with additional aspects of this embodiment, the solid state drive may be flash memory comprising stacks of die, and wherein the monitoring comprises determining how many die are simultaneously executing operations.

In accordance with further aspects of this embodiment, the preset threshold may be a predetermined number of die actively executing operations simultaneously.

In accordance with additional aspects of this embodiment, the method may further include executing the operation when it is determined that the new operation would not exceed the preset threshold.

In accordance with additional aspects of this embodiment, the method may further include applying a timing offset to the new operation.

In accordance with additional aspects of this embodiment, the method may further include monitoring power consumption of the attached memory.

In accordance with additional aspects of this embodiment, the method may further include changing the timing offset based on monitored power consumption.

In accordance with other aspects of this embodiment, the method may further include generating an alert based on the monitored power consumption of the attached memory.

In accordance with further aspects of this embodiment, the method may further include determining whether the monitored power consumption of the attached memory has exceeded a predetermined power threshold for predetermined time period; and controlling an I/O rate of the attached memory based on the determination.

In accordance with other aspects of this embodiment, the I/O rate of the attached memory may be decreased when it is determined that the monitored power consumption of the attached memory has exceeded the predetermined power threshold for the predetermined time period.

In accordance with additional aspects of this embodiment, the I/O rate of the attached memory may be maintained when it is determined that the monitored power consumption of the attached memory has not exceeded the predetermined power threshold for the predetermined time period.

In accordance with additional aspects of this embodiment, the power may be provided directly to the memory via a plurality of PCIe interface channels.

In accordance with additional aspects of this embodiment, the method may further include monitoring power consumption of the attached memory while idle; monitoring power consumption of the attached memory while executing at least one predetermined operation; and determining a power credit for each operation based on a comparison of the monitored power consumption while idle and while executing the at least one predetermined operation.

In accordance with other aspects of this embodiment, the predetermined operation may be one of a read, a write, and an erase operation.

In accordance with additional aspects of this embodiment, the method may further include assigning a total number of system credits for the attached memory; assigning at least one credit to the new operation; determining whether the assigned at least one credit of the new operation exceeds the total number of system credits; and executing the new operation based on the determination of whether the assigned at least one credit would exceed the total number of system credits.

In accordance with additional aspects of this embodiment, execution of the new operation may be stalled until the assigned credit would no longer exceed the total number of system credits.

In some embodiments, the techniques may be realized as a computer program product comprised of a series of instructions executable on a computer, the computer program product performing a process for controlling power on a Peripheral Component Interconnect Express (PCIe) interface; the computer program implementing the steps of: providing power to a memory attached via the PCIe interface; monitoring a state of the attached memory; determining whether a new operation to be implemented on the attached memory would cause the power provided to the memory to exceed a preset threshold; and stalling execution of the new operation on the attached memory when it is determined that the new operation would exceed the preset threshold while continuing execution of preexisting operations on the attached memory.

In some embodiments, the techniques may be realized as a system for controlling power on a Peripheral Component Interconnect Express (PCIe) interface, the system comprising: a power module that supplies power to a memory attached via the PCIe interface; a monitoring module that monitors a state of the attached memory; a determination module that determines whether a new operation to be implemented on the attached memory would cause the power provided to the memory to exceed a preset threshold; and a stalling module that stalls execution of the new operation on the attached memory when it is determined that the new operation would exceed the preset threshold while continuing execution of preexisting operations on the attached memory.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

Figure 1:
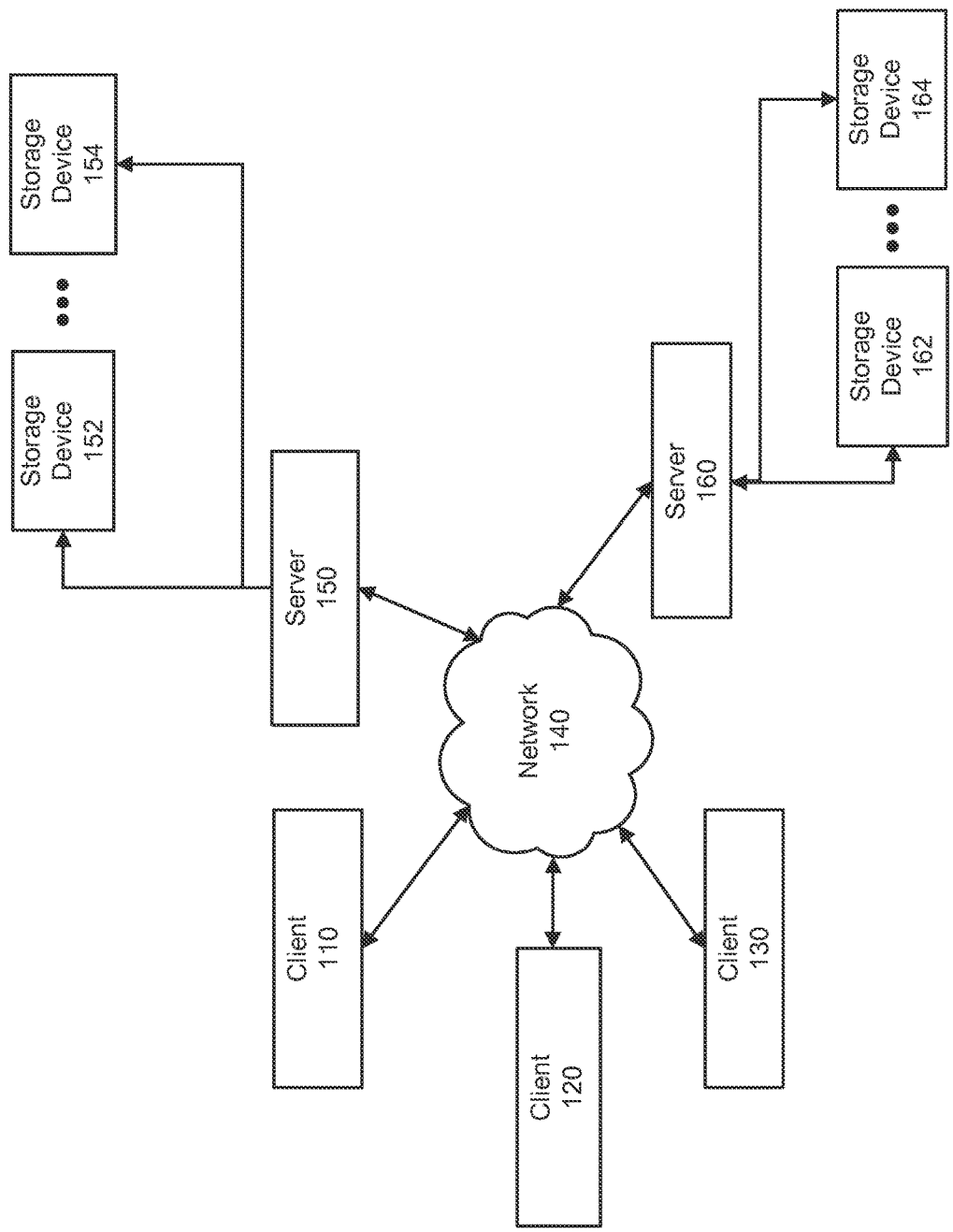
FIG. 1 shows a block diagram depicting a computing architecture in accordance with an embodiment of the present disclosure.

FIG. 1 shows a block diagram depicting a computing architecture 100 in accordance with an embodiment of the present disclosure. The computing architecture 100 may include additional elements that are not depicted. Computing architecture 100 may contain clients computing systems 110, 120 and 130, as well as servers 150 and 160. The servers 150 and 160 may implement the computing system 200 shown in FIG. 2. Each of the clients 110-130 and the servers 150-160 may be communicatively coupled to a network 140. Server 150 may be connected to a plurality of storage devices 152 and 154. Server 160 may be connected to a plurality of storage devices 162 and 164. Although only two storage devices are illustrated as being coupled to the servers 150 and 160, additional storage devices may be provided. In some instances, the storage devices 152, 154, 162, and 164 may be non-volatile memory storage systems. For example, the storage devices 152, 154, 162, and 164 may be solid-state memory (e.g., flash memory, solid state device (SSD), etc.), optical memory, or magnetic memory.

Figure 2:
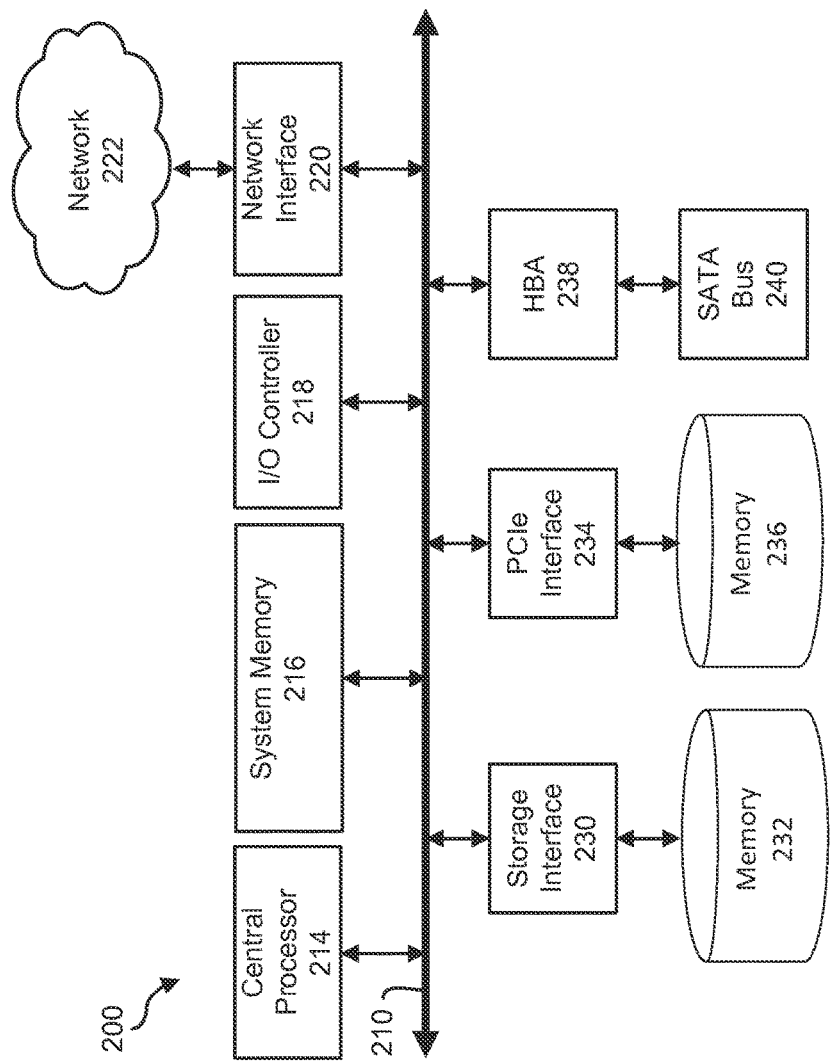
FIG. 2 shows a block diagram depicting a computer system in accordance with an embodiment of the present disclosure.

FIG. 2 shows a block diagram depicting a computer system 200 in accordance with an embodiment of the present disclosure. The computer system 200 may contain a bus 210 connecting subsystems of computer system 200 including a central processor 214, a system memory 216 (e.g., RAM (Random Access Memory). ROM (Read Only Memory), flash RAM, etc.), an Input/Output (I/O) controller 218, and a network interface 220. The network interface 200 may communicatively couple the computer system 200 to a network 222 (e.g., a local area network, wide area network, the internet, etc.). The bus 210 may also connect a storage interface 230 to memory 232, a PCIe interface 234 to memory 236, and a host bus adapter (HBA) to a serial ATA (SATA) bus 240. The SATA bus 240 may connect the computer system 200 to additional storage systems. The computer system 200 may contain additional devices or subsystems not illustrated.

Figure 3:
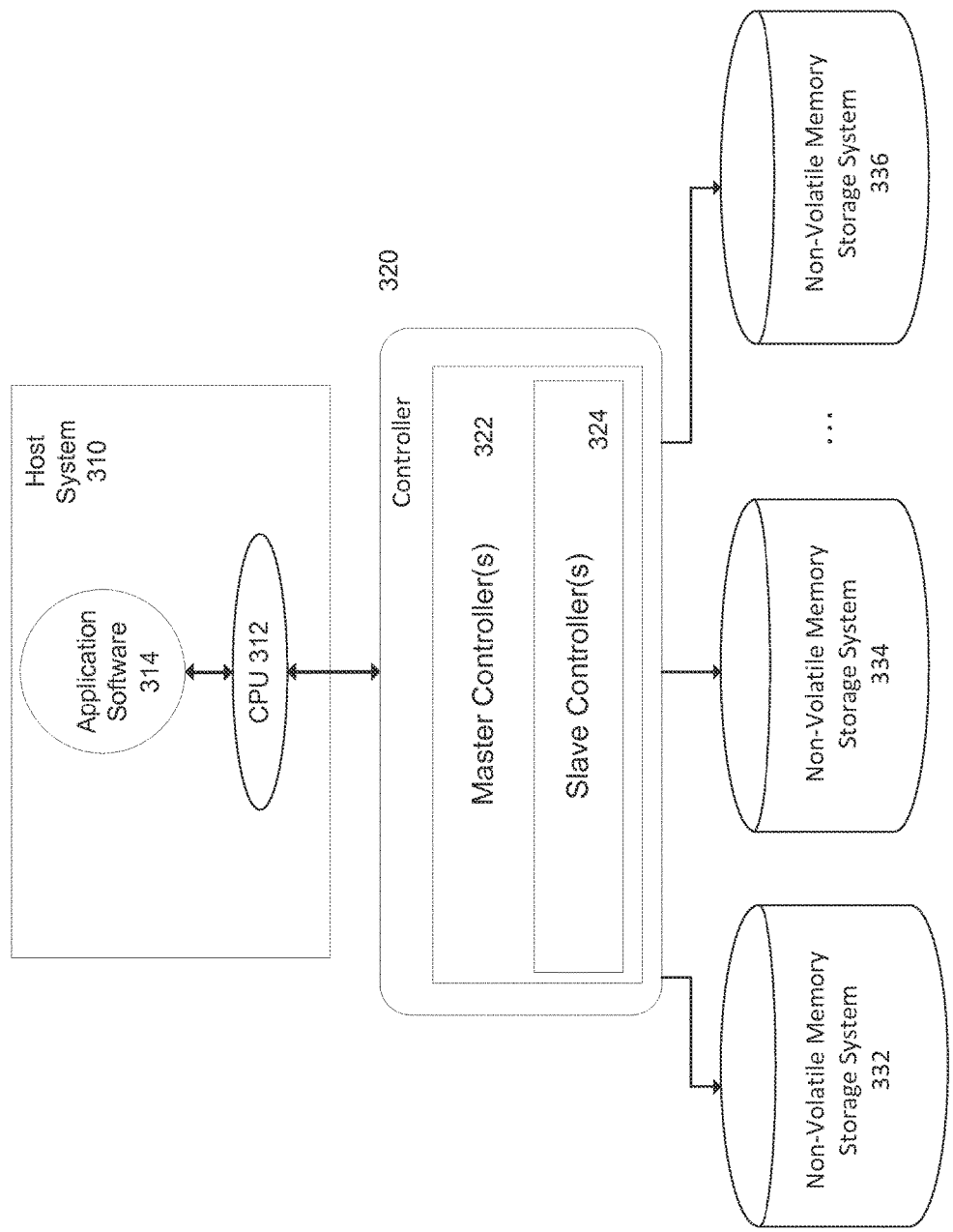
FIG. 3 shows an exemplary block diagram depicting PCIe non-volatile storage systems in accordance with the present disclosure.

FIG. 3 shows a block diagram depicting a PCIe non-volatile memory storage system 300 in accordance with an embodiment of the present disclosure. The PCIe non-volatile memory storage system 300 may include a host system 310, a memory controller 320, and non-volatile memory storage systems 332-336. The PCIe non-volatile memory storage system 300 may be implemented on any one of the clients 110-130 and the servers 150 and 160. For example, any one of the clients 110-130 and the servers 150 and 160 may be the host system 320 having at least one CPU 312 implementing application software 314. In some instances, the host system 310 may execute application software 314 on at least one CPU 312 to execute operations on the non-volatile memory storage systems 332-336 via the controller 320.

The application software 310 may be any applicable software for executing operations (read, write, erase, control operations, etc.) on the PCIe non-volatile memory storage system 300. For example, the application software 310 may read or write data stored on any one of the non-volatile memory (NVM) storage systems 332-336. The application software 310 may implement the operations on the NVM storage systems 332-336 via the controller 320.

The controller 320 shown in FIG. 3 may be a memory controller for implementing operations on the attached NVM storage systems 332-336 and comprise at least one master controller 322 and at least one slave controller 324. In particular, the controller 320 may provide processors (e.g., CPU 312) implementing the application software 314 access to the NVM storage systems 332-336. In some instances, a controller 320 may be implemented on each of the NVM storage systems 332-336 or as part of a separate computer system (e.g., server 150). In other instances, a single controller may be provided to control the NVM storage systems 332-336. The controller 320 may provide buffers or queues that temporarily store operations to be implemented on the NVM storage systems 332-336. The controller 320 may also provide scheduling functionality to appropriately distribute operations across the NVM storage systems 332-336 in conjunction with the queues.

In some embodiments, the controller 320 may contain a plurality of master controllers 322 directed to providing access to the NVM storage systems 332-336. The master controller 322 may be an aggregation controller to implement operations on the NVM storage systems 332-336. Each master controller 322 may contain a plurality of slave controller 324. The slave controller(s) 324 may be a flash channel controller to arbitrate for the various channels of the NVM storage systems 332-336. The channels of the NVM storage systems 332-336 may be implemented as part of a PCIe interface connecting processors executing the application software 310 to the NVM storage systems 332-336. As described further below, the master controller(s) 322 and the slave controller(s) 324 may aid in controlling an amount of power supplied to the NVM storage systems 332-336.

The non-volatile memory storage systems 332-336 shown in FIG. 3 may be directly connected to a PCIe interface. For example, NVM storage system 332 may be a memory card composed of a printed circuit board containing a plurality of flash memory chips (e.g, NAND or NOR). Each flash memory chip may be composed of a plurality of die. The PCIe interface may provide multiple channels to access the flash memory chips on the NVM storage system 332 concurrently. Each of the channels may be controlled by a slave controller 324 which provides the master controller 322 with access to the NVM storage systems 332-336.

The PCIe interface (e.g., bus or slot) may provide power to each of the NVM storage systems 332-336. However, the PCIe interface is limited in the amount of power that may be safely supplied to a NVM storage system. For example, the PCIe interface may provide a maximum power of up to 25 W. Exceeding this amount of power may cause damage to the interface and/or the attached NVM storage. Accordingly, the application software 310 and the controller 320 may provide additional functionality of monitoring and controlling the amount of power provided via the PCIe interface to the NVM storage as described in detail below.

Figure 4:
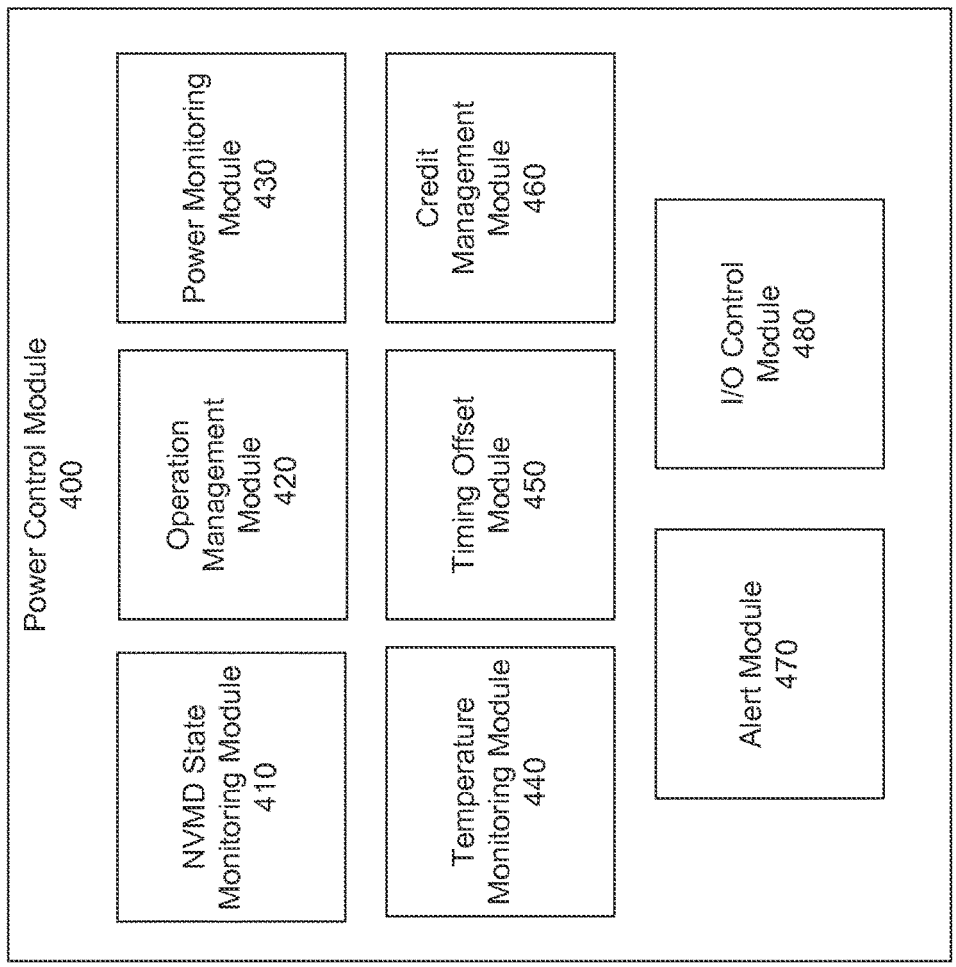
FIG. 4 depicts a block diagram depicting a module in accordance with an embodiment of the present disclosure.

FIG. 4 shows a power control module 400 in accordance with an embodiment of the present disclosure. As illustrated, the power control module 400 may contain one or more components including a non-volatile memory device (NVMD) state monitoring module 410, an operation management module 420, a power monitoring module 430, a temperature monitoring module 440, a timing offset module 450, a credit management module 460, an alert module 470, and an I/O control module 480.

The non-volatile memory device (NVMD) state monitoring module 410 may monitor the operations executed on a NVMD. As described above, the NVM storage systems 332-336 may implement a variety of operations including, for example, reads, writes, resets, etc. The NVMD state monitoring module 410 may accordingly monitor the operations executed on each of the NVM storage systems 332-336. The NVMD state monitoring module 410 may also maintain a count of how many die of the NVM storage systems 332-336 are simultaneously active.

The operation management module 420 may control which operations are allowed to proceed with respect to the NVM storage system based on the monitored operations from the NVMD state monitoring module 410. For example, the operation management module 420 may control how many die of the NVM storage systems 332-336 may be simultaneously active based on preset limits. If a particular new operation may cause the number of active die to exceed a preset limit, then the operation may be stalled until the number of active die is sufficiently below a preset limit. The operation management module 420 may also remove any preset active die limits in the event of a power down scenario to allow all operations scheduled to execute as soon as possible. In some embodiments, the operation management module 420 may be implemented as part of the slave controller 324.

The power monitoring module 430 may monitor the amount of power consumed by attached NMVDs. For example, the power monitoring module 430 may monitor the amount of power consumed by each of the NVM storage systems 332-336. The power monitoring module 430 may monitor the power consumption continuously or periodically using sensors. The monitored power information may be provided to the operation management module 420, the alert module 470, and the I/O control module 480. Certain operations such as erase and program may require higher amounts of power, require multiple iterations, and may last for longer period of time. Accordingly, these operations may cause spikes in power consumption. Spikes in power consumption may particularly occur when multiple die are operating in parallel across several channels. For example, if a plurality of die are simultaneously erasing or writing then the power consumption peaks of the multiple iterations necessary to perform the operations may align and cause a spike in the power to exceed applicable power thresholds. This type of power consumption may be monitored by the power monitoring module 430. In some embodiments, the power monitoring module 430 may be implemented as part of the controller 320.

The temperature monitoring module 440 may monitor the operating temperature of attached NMVDs. For example, the temperature monitoring module 440 may monitor the temperature at each of the NVM storage systems 332-336. The temperature monitoring module 440 may monitor the temperature continuously or periodically using sensors. The monitored temperature information may be provided to the operation management module 420, the alert module 470, and the I/O control module 480. In some instances, the alert module 470 and/or the I/O control module 480 may implement remedial measures if the temperature detected by the temperature monitoring module 440 exceeds a preset threshold. In some embodiments, the temperature monitoring module 440 may be implemented as part of the controller 320.

The timing offset module 450 may stagger operations to be implemented with respect to attached NMVDs. For example, the timing offset module 450 may stagger operations to be implemented on each of the NVM storage systems 332-336. In some embodiments, the timing offset module 450 may receive an operation to be executed on a NVMD from a processor and apply a timing offset such that the peak power consumption for each operation may be misaligned in time. The timing offset applied by the timing offset module 450 may depend on the type of operation to be performed in some instanced. In some embodiments, the timing offset may be a static number (e.g., 1 microsecond, 10 microseconds, 20 microseconds, 30 microseconds, etc.). In other embodiments, the timing offset may be randomized. The power monitoring module 430 may monitor the power consumption of the NVMD after the timing offset has been applied to determine whether the offset needs to be adjusted and to identify an optimal reduction of peak power. In some embodiments, the timing offset module 450 may be implemented as part of the controller 320.

The credit management module 460 may control power consumption of attached NVMDs. For example, the credit management module 460 may control power consumption of the NVM storage systems 332-336 in accordance with a credit scheme for each operation implemented on the NVM storage systems 332-336. In some embodiments, the credit management module 450 may assign credit amounts for each operation that may be executed on the NVM storage systems 332-336. For instance, read operations may be assigned a credit amount, write operations may be assigned another credit amount, and additional credit amounts may be assigned to other operations. The credit amounts may be determined based on actual operation of the NVM storage systems 332-336 as monitored by the power monitoring module 430. The credit scheme may also depend upon the number of die to be activated during a particular operation.

The alert module 470 may alert a user or administrator when conditions occur that are outside of acceptable parameters. In some embodiments, the alert module 460 may generate and display an alert to a user based upon the monitoring performed by the power monitoring module 430 and the temperature monitoring module 440. For example, the alert module 470 may generate and display an alert when the power consumption or the temperature exceeds a preset threshold.

The I/O control module 480 may control the input/output rate with respect to attached NVMDs. For example, the I/O control module 480 may control the input/output rate with respect to the NVM storage systems 332-336 in accordance with the monitoring performed by the power monitoring module 430 and the temperature monitoring module 440. In some embodiments, the I/O control module 480 may reduce the I/O rate with respect to one or a plurality of the NVM storage systems 332-336 when the power consumption reaches predetermined levels at or near the maximum power consumption allowed by the PCIe interface. Additionally, the I/O control module 480 may reduce the I/O rate with respect to one or a plurality of the NVM storage systems 332-336 when the operating temperature of the NVM storage systems 332-336 reaches predetermined levels. When the power consumption and/or temperature falls back within an acceptable range, the I/O control module 480 may accordingly increase the I/O rate.

Figure 5:
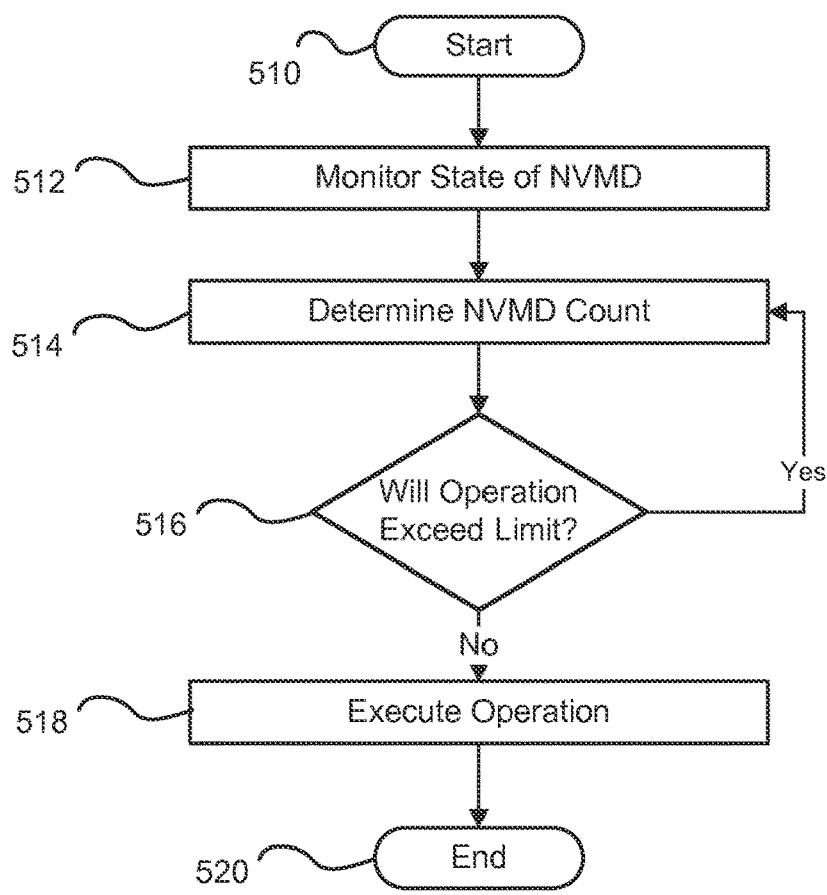
FIG. 5 depicts a flowchart illustrating a method for controlling power in PCIe non-volatile storage systems in accordance with the present disclosure.

FIG. 5 shows a method 500 for controlling power supplied via a PCIe interface in accordance with an embodiment of the present disclosure. In some embodiments, the method 500 may be performed at a hardware level such as controller 320. The method 500 may advantageously reduce an average power consumed by NVMD. At block 510, the method 500 may begin.

At block 512, states of non-volatile memory devices (NVMD) may be monitored. In some embodiments, the NVMD state monitoring module 410 may monitor the NVMDs. For instance, the NVMD state monitoring module 410 may monitor the NVM storage systems 332-336. NVMD (e.g., flash memory) contain stacks of multiple die that implement operations. These die may execute high current operations that are programmable and under microcode control. The NVMDs may be monitored to determine whether the die of the NVMDs are in a ready/busy state and to determine which operations are being performed on the NVMD. After the state of the NVMD has been monitored at block 512, the overall process may proceed to block 514. However, monitoring of the NVMD may also be performed concurrently with other steps in the overall process.

At block 514, a current count for each NVMD may be determined. In some embodiments, the operation management module 420 may determine a count for each NVMD. The count may indicate how many die are currently simultaneously active and be based on the monitoring of the states performed at block 512. In some instances, the count may be how many die are simultaneously active within each stack of die, a preset region of the NVMD, or the entire NVMD. After the count for each NVMD has been determined at block 514, the overall process may proceed to block 516.

At block 516, the current count of the NVMD determined at block 514 may be compared to an overall count limit for the NVMD. In some embodiments, the operation management module 420 may compare the current count to the overall count limit. The overall count limit may be a preset or predetermined limit of how many die can perform an operation (e.g., read, write, etc) at the same time. This number may be preset prior to operation of the NVMD or may be based on monitored operations of the NVMD. The overall count may be specific to each stack of die, a preset region of the NVMD, or the entire NVMD. The current count identified at block 514 may be compared to the overall count to determine whether a new operation to be implemented on the NVMD may cause the count of active die to exceed the overall count. If the new operation would not cause the current count to exceed the overall count limit, then the process may proceed to block 518. However, if the new operation would cause the current count to exceed the overall count limit, then the process may proceed back to block 514 until the current count drops to an appropriate level. In some instances, the overall count limit may be removed during a power down scenario such that all operations are allowed to execute as soon as possible.

In one example, six die in a stack of a NVMD may be simultaneously active in a stack of ten die. Accordingly, the current count for that stack is six. In this example, the overall count or preset limit may be eight die. If a new operation would result in a total of seven die being simultaneously active, then the operation is allowed to proceed and be executed on the stack of die. However, if the new operation would result in the total of active die exceeding eight then the operation would be required to wait until the current count of active die drops to an appropriate level.

At block 518, the operation may be executed on the NVMD. After the operation has been executed or execution has been initialized, the overall proceed may proceed to block 520.

At block 520, the process may end. In some embodiments, the process may proceed back to step 510 and may be repeated periodically or continuously.

Figure 6:
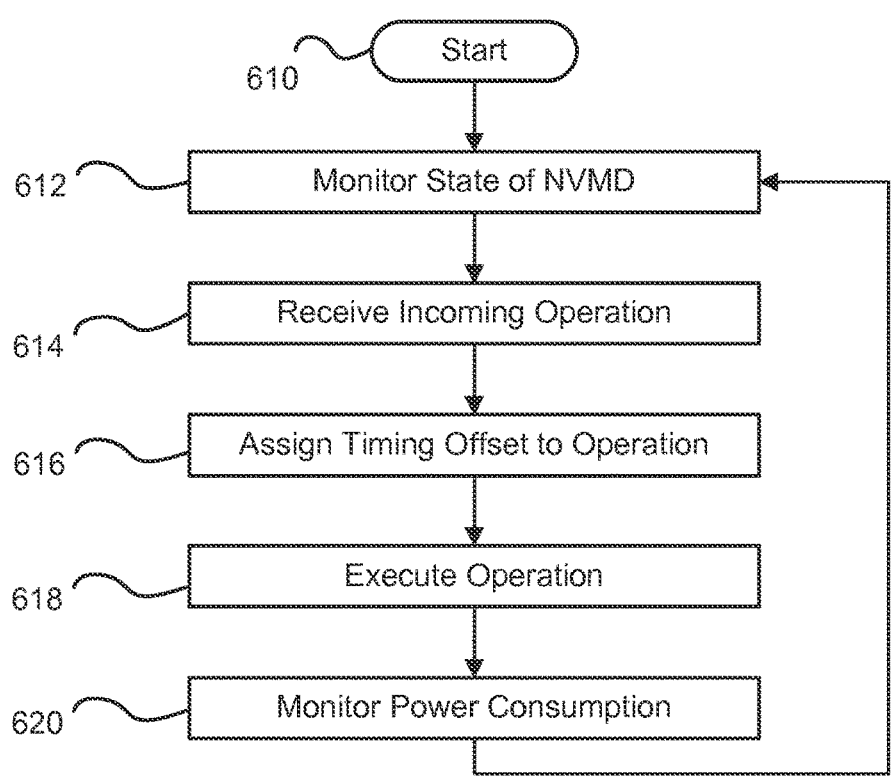
FIG. 6 depicts a flowchart illustrating a method for controlling power in PCIe non-volatile storage systems in accordance with the present disclosure.

FIG. 6 shows a method 600 for controlling power supplied via a PCIe interface in accordance with an embodiment of the present disclosure. In some embodiments, the method 600 may be performed at a hardware level such as controller 320. The method 600 may advantageously limit peak power consumed by non-volatile memory devices (NVMD). At block 610, the method 600 may begin.

At block 612, states of NVMD may be monitored. In some embodiments, the NVMD state monitoring module 410 may monitor the NVMDs. For instance, the NVMD state monitoring module 410 may monitor the NVM storage systems 332-336. NVMD (e.g., flash memory) contain stacks of multiple die that implement operations. The NVMDs may be monitored across several channels where multiple die are operating in parallel. In particular, the NVMD may be monitored to determine which die are operating and the types of operations being performed (e.g., read, write, erase, etc.). Certain operations may consume more power over longer periods of time and may contribute to peaks in power consumption. As a result, multiple operations being executed in parallel can align and cause a spike in the instantaneous power of the NVMD that may exceed the allowable power limits for the channels or bus/slot of the PCIe interface. After the state of the NVMD has been monitored at block 612, the overall process may proceed to block 614. However, monitoring of the NVMD may also be performed concurrently with other steps in the overall process.

At block 614, a new operation to be executed on the NVMD may be received. In some instances, the new operation may be received at controller 320 from a processor 312 executing application software 314. The new operation may be any application operation to be executed on the NVMD (e.g., read, write, erase, etc.). After the new operation has been received at block 614, the overall process may proceed to block 616.

At block 616, a timing offset may be assigned to the new operation received at block 614. In some embodiments, the timing offset may be assigned by the timing offset management module 450. The timing offset may be static. For example, a static offset (e.g., 1 microsecond, 10 microseconds, 20 microseconds, 30 microseconds, etc.) may be applied to each new operation. The timing offset may alternatively be randomized. Further, the timing offset may be different depending upon the type of operation to be performed. For instance, a longer time may be applied to write operations while a shorter time may be applied to read operations.

At block 618, the operation may be performed on the NVMD in accordance with the timing offset applied at block 616. In some instances, the operation may be performed on non-volatile memory storage systems 332-336. As a result of applying a timing offset to newly received operations, the operations being performed in parallel on the NVMD may be staggered to reduce the chance of peaks aligning and causing the overall power consumption of the NVMD to exceed the power limits of the PCIe interface. After the new operation has been executed on the NVMD at block 618, the overall process may proceed to block 620.

At block 620, the power consumption of the NVMD executing the operations may be monitored. In some instances, the power consumption may be monitored by the power monitoring module 430. Based upon the monitoring of the power consumption at block 620, the timing offset(s) may be adjusted to ensure that the power consumption does not exceed the PCIe interface limits. Accordingly, the process may proceed back to step 610 and repeated periodically or continuously.

Figure 7:
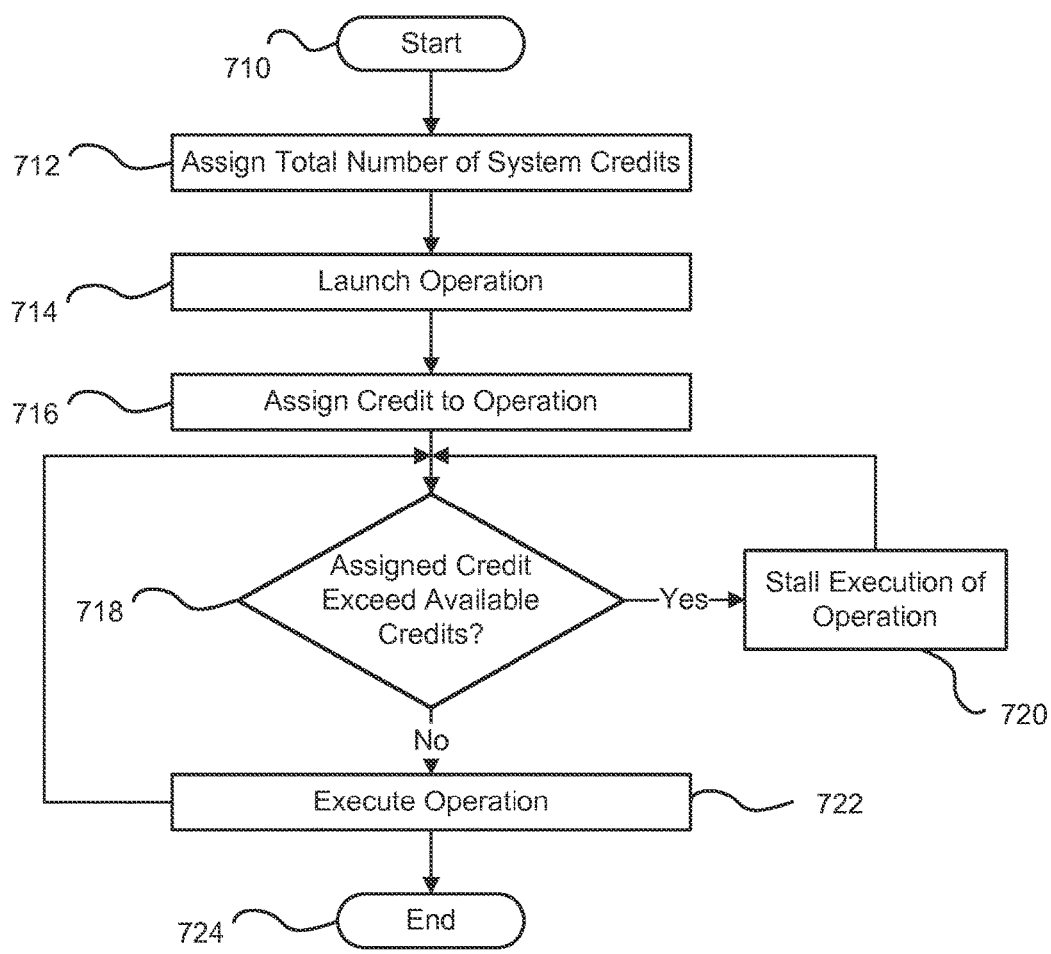
FIG. 7 depicts a flowchart illustrating a method for controlling power in PCIe non-volatile storage systems in accordance with the present disclosure.

FIG. 7 shows a method 700 for controlling power supplied via a PCIe interface using a credit system, in accordance with an embodiment of the present disclosure. For example, the overall power provided to NVMDs via a PCIe interface may rely on a power credit system for the attached NVMD. A total amount of power credits available for the NVMD may be determined, power credit amounts may be assigned to each operation that may be performed on the attached NVMD, and an available power credit amount may be continually updated. Accordingly, when a new operation is to be executed on the NVMD, the new operation may be compared to the available credit to determine whether the operation should proceed. Method 700 is one example of such a power credit system. In some embodiments, the method 700 may be performed at a host system level such as host system 310. The method 700 may advantageously limit the overall power consumed by non-volatile memory devices (NVMD) by ensuring the new operations do not cause the amount of power consumed by the attached NVMD to exceed power thresholds. At block 710, the method 700 may begin.

At block 712, a total number of system credits for the NVMD implementing operations may be assigned. In some instances, the total number of system credits may be assigned by the credit management module 460 and be power credits. The total number of system credits available may be assigned based on various characteristics of the NVMD. For example, the system credits may be based on the total amount of storage space on the attached NVMD, the total number of die on the attached NVMD, I/O rates, etc.

In some embodiments, the total number of credits may be based on the number of dies in the NVMD. In addition, the total number of credits may also be based on the types of operations executed by the NVMD. The total number of credits for the system may be computed using the following formula: total credits=max (rd_credits*rd_dies, wr_credits*wr_dies, er_credits*er_dies). Rd_credits may correspond to a number representing the power required by a read operation on a die. Wr_credits may correspond to a number representing the power required by a write operation on a die. Er_credits may correspond to a number representing the power required by an erase operation on a die. Rd_dies may correspond to the maximum number of dies that can be activated in parallel for read operations. Wr_dies may correspond to the maximum number of dies that can be activated in parallel for write operations. Er_dies may correspond to the maximum number of dies that can be activated in parallel for erase operations. The credits for each type of operation (e.g., read, write, and erase) may be based on an expected or measured amount of power consumed by a NVMD to perform the operation. Further, the number of system credits may be updated when there is a change in the threshold I/O rate as described below with respect to process 800. After the total number of system credits has been assigned at block 712, the overall process may proceed to block 714. In some instances, the total number of system credits may be determined for each operation while in other instances determination of the total number of system credits is not necessary. In such a case, the overall process 700 may proceed from block 710 to block 714.

At block 714, a new operation to be executed on attached NVMD may be launched. In some embodiments, the new operation may be launched by the application software 314 executed on the CPU 312. The new operation may be any application operation to be executed on the NVMD (e.g., read, write, erase, etc.). After the new operation has been launched at block 714, the overall process may proceed to block 716.

At block 716, a credit may be assigned to the new operation launched at block 714. In some instances, the credit assigned to the new operation may be assigned by the credit management module 460. The credit assigned to the new operation may be based on the particular type of operation (e.g., read, write, erase, etc.). The credit assigned to the new operation may also be based on the number of dies necessary to implement the operation. For example, the credit assigned to each new operation to be implemented by the NVMD may be <op>_credits*num_dies_activated by the operation number of credits where <op>_credits may correspond to either a rd_credit wr_credit, or er_credit. The amount of credit assigned to each operation may be determined by monitoring characteristics of the NVMD as described with respect to FIG. 9. The credits may be generally assigned to operations in a first in first out (FIFO) order to better ensure fairness and avoid starvation. However, for high priority operations, the credit provisioning steps may be bypassed and the process may proceed to block 722 for execution of the operation.

In some embodiments, the assignment of credits may be piggybacked on credits previously assigned to an ongoing/in-hw-queue operation. For example, if a write operation is currently in progress on a die of the NVMD, then this write is holding onto wr_credits. If a read operation is newly issued into the queue, then the read issued into the queue may be held in the queue and serialized behind the write operation on the die. In this instance, the credits necessary to implement the read operation may reuse the credits previously assigned to the write operation without the issuance of new credits. In this example, if the wr_credits are greater than or equal to the rd_credits (wr_credits≥rd_credits) necessary to perform the new operation, no new credits are needed for the read to be executed and the read operation may piggyback on the wr_credits already assigned to that die. However, if the rd_credits necessary for the new read operation are greater than the wr_credits (rd_credits>wr_credits) of the current write operation, then the read operation may be piggyback on the wr_credits and be issued remaining credits (rd_credits-wr_credits) to perform the operation. After the credits have been assigned to the new operation at block 716, the overall process may proceed to block 718.

At block 718, the number of credits assigned to the new operation at block 716 may be compared to the total number of credits currently available. In some embodiments, the comparison may be performed by the credit management module 460. The amount of available credits may be the total number of system credits determined at block 712 less the number of credits previously assigned to operations currently being implemented on the NVMD. If the credits assigned to the new operation at block 716 exceed the available credits, then the process may proceed to block 720. However, if the credits assigned to the new operation at block 716 do not exceed the available credits, then the process may proceed to block 722.

At block 720, execution of the new operation may be stalled. In some instances, the new operation may be stalled at the host system 310 until the number of credits available exceeds the number of credits assigned to the new operation at block 716. The overall process may proceed back to block 718 for this determination.

At block 722, the new operation may be released to the NVMD and executed. In some embodiments, upon execution of the new operation, the credits associated with that operation may be released and the operation stalled at block 720 may proceed by assigning those credits to the stalled operation at block 718. After the new operation has been released for execution on the NVMD, the overall process may proceed to block 724.

At block 724, the process may end. In some embodiments, the process may proceed back to step 710 and repeated periodically or continuously.

Figure 8:
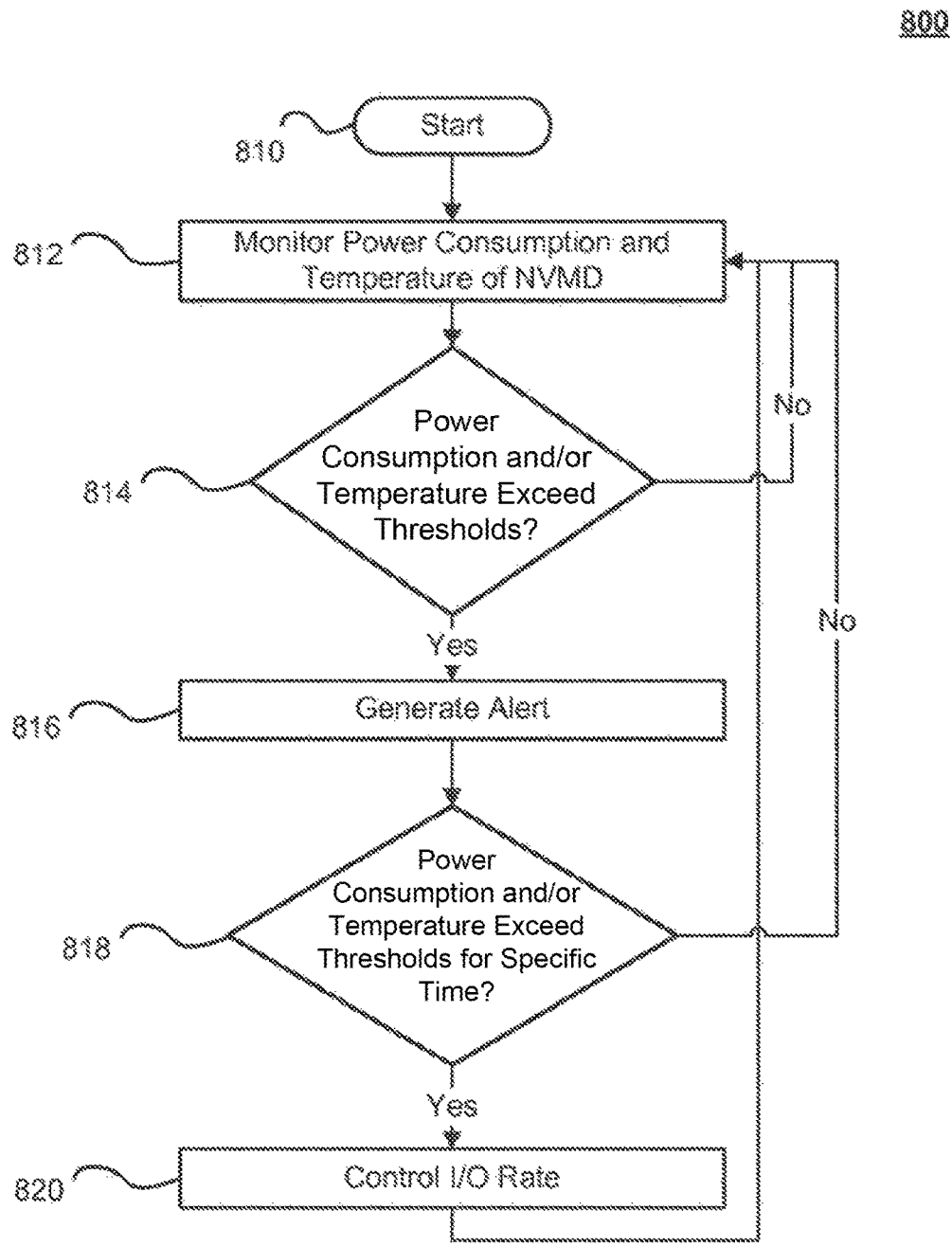
FIG. 8 depicts a flowchart illustrating a method for controlling power in PCIe non-volatile storage systems in accordance with the present disclosure.

FIG. 8 shows a method 800 for controlling power supplied via a PCIe interface in accordance with an embodiment of the present disclosure. In some embodiments, the method 800 may be performed at a host system level such as host system 310. At block 810, the method 800 may begin.

At block 812, the power consumption of the NVMD may be monitored. In some embodiments, the power consumption may be monitored by the power monitoring module 430. At block 812, the temperature of the attached NVMD may also be monitored. In some embodiments, the temperature may be monitored by the temperature monitoring module 440. The power consumption may be the total consumption of power by the attached NVMD, consumption by attached device, and/or consumption by channel.

At block 814, it may be determined whether the power consumption and/or the temperature exceed predetermined or preset limits. In some embodiments, the determination of whether the power consumption and/or the temperature exceed predetermined or preset limits may be performed by the power monitoring module 430 and the temperature monitoring module 440. The predetermined or preset limits may be set by a user or an administrator of the system. If it is determined that the power consumption and/or the temperature do not exceed predetermined or preset limits, the overall process may proceed back to block 812. However, if it is determined that the power consumption and/or the temperature do exceed predetermined or preset limits, the overall process may proceed back to block 816.

At block 816, an alert may be generated. In some embodiments, the alert may be generated by the alert module 470. The alert may be any appropriate way to communicate to a user or administrator that the attached NVMD is operating outside of preset limits. For example, the alert may be displayed to a user or administrator via a computer display. Alternatively, the alert may be sent to a user or administrator as an email. After the alert has been generated, the overall process may proceed to block 818.

At block 818, it may be determined whether the power consumption and/or the temperature exceed the predetermined or preset limits for a specific period of time. In some embodiments, the determination of whether the power consumption and/or the temperature exceed predetermined or preset limits for a specific period of time may be performed by the power monitoring module 430 and the temperature monitoring module 440. The specific time period may be set by a user or an administrator of the system. If it is determined that the power consumption and/or the temperature have not exceeded the predetermined or preset limits for the specific period of time, the overall process may proceed back to block 812. However, if it is determined that the power consumption and/or the temperature have exceeded the predetermined or preset limits for the specific period of time, the overall process may proceed to block 820.

At block 820, the I/O rate of the NVMD may be adjusted in accordance with the monitoring of the power consumption and temperature. In some embodiments, the controlling of the I/O rate may be performed by the I/O control module 480. In at least one example, the I/O rate of the NVMD may be throttled down by reducing the number of available credits to a fraction or percentage of the total system credits identified and described above. If the total system credit is 1000, for example, the I/O rate may be throttled down to 80% such that only 800 system credits are available to implement operations. In some embodiments, after reducing the I/O rate, the power consumption and temperature may be monitored to determine whether they are within the acceptable preset limits. If the power consumption and temperature fall back within the acceptable limits, the I/O rate may then be increased and the process may proceed back to block 812.

In another embodiment, the I/O rate of the attached NVMD may be adjusted for a particular user. The ideal user bandwidth (ubw) for a workload at an I/O rate of P can be represented using the following formula: $ubw(p)=(p*ubw(100))/100$.

Figure 9:
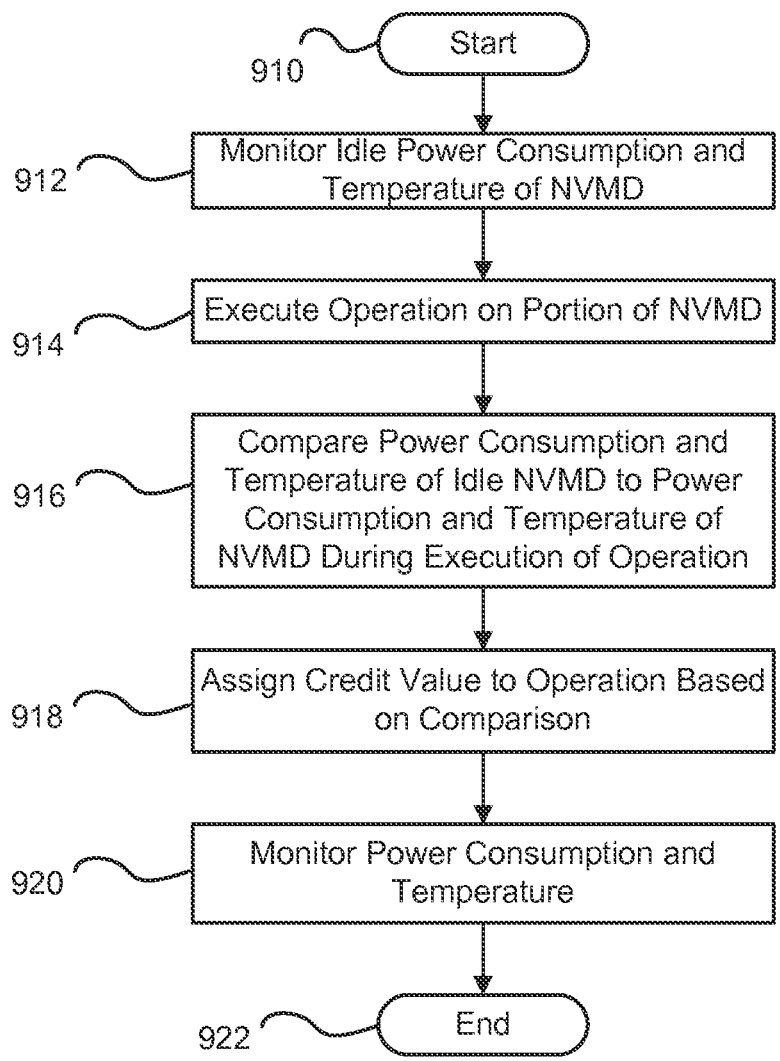
FIG. 9 depicts a flowchart illustrating a method for controlling power in PCIe non-volatile storage systems in accordance with the present disclosure.

FIG. 9 shows a method 900 for controlling power supplied via a PCIe interface in accordance with an embodiment of the present disclosure. In some embodiments, method 900 may be performed during system start up initialization. At block 910, the method 900 may begin.

At block 912, the power consumption and temperature of the NVMD may be monitored while the NVMD is idle. In some embodiments, the power consumption may be monitored by the power monitoring module 430 and the temperature may be monitored by the temperature monitoring module 440. The maintaining of the power consumption and temperature of the attached NVMD may be performed over a period of time that the NVMD is idle. By measuring the power consumption and temperature when idle, baseline characteristics of the attached NVMD may be determined. After the power consumption and temperature of the NVMD have been monitored while the NVMD is idle, the overall process may proceed to block 914.

At block 914, an operation may be executed on a portion of the attached NVMD. In some embodiments, a plurality of operations may be performed. For example, a series of read operations, write operations, and erase operations may be performed. In addition, the operations may be implemented on a particular portion of each of the attached NVMD. During execution of each operation, the power consumption and temperature of the NVMD may be monitored. After each operation has been executed on the NVMD, the overall process may proceed to block 916.

At block 916, the characteristics of the NVMD including the amount of power consumed and the temperature during execution of each operation at block 914 may be compared to the power consumption and temperature of the NVMD while the NVMD is idle determined at block 912. In some embodiments, the power and temperature may be compared by the power monitoring module 430 and the temperature monitoring module 440, respectively. In particular, the additional power consumed and increase in temperature for particular operations may be identified. After the power consumption and temperature during execution of each operation is compared to the power consumption and temperature of the NVMD while idle, the overall process may proceed to block 918.

At block 918, a credit value or amount for each operation performable on the NVMD may be assigned based on the comparison of power consumption and temperature at block 916. In some embodiments, the credit management module 460 may assign the credit value or amount. For example, operations that require higher amounts of power and lead to a greater increase in temperature may be assigned a larger number of necessary credits while operations requiring less power and leading to lower temperature increases may be assigned smaller credit values. In at least one example, a write operation may consume a large amount of power and cause a greater increase in temperature than a read operation. A read operation may accordingly be assigned a credit value of five while a write operation is assigned ten. Thus, upon the issuance of a new operation to be implemented on the NVMD as described above, the credit values determined in the process 900 may be utilized. For instance, the credit assigned to each operation at block 918 may be utilized at block 716 of process 700. After the credit value or amount for each operation performable on the NVMD has been assigned at block 918, the overall process may proceed to block 920.

At block 920, the power consumption and temperature of the NVMD may be again monitored over time while the operations are being performed by the NVMD. In some embodiments, the power consumption may be monitored by the power monitoring module 430 and the temperature may be monitored by the temperature monitoring module 440. Accordingly, if it is determined that the power and temperature characteristics of the attached NVMD change over time, the assigned credit values for each operation may be adjusted. After the power consumption and temperature of the NVMD has been monitored to block 920, the overall process may proceed to block 922.

At block 922, the process may end. In some embodiments, the process may proceed back to step 910 and repeated periodically or continuously.

Other embodiments are within the scope and spirit of the invention. For example, the functionality described above can be implemented using software, hardware, firmware, hardwiring, or combinations of any of these. One or more computer processors operating in accordance with instructions may implement the functions associated with controlling power on PCIe direct attached memory storage subsystems in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

Accordingly, the claims set forth below should be construed in view of the full breadth and spirit of the present disclosure as described herein.

What is claimed is:

1. A method for controlling power on a peripheral component interconnect express (PCIe) interface, the method comprising:
    providing power to a memory attached via the PCIe interface;
    determining whether a new operation to be implemented on the attached memory would cause the power provided to the attached memory to exceed a preset limit;
    executing the new operation, in response to determining that the new operation would not cause the power to exceed the preset limit;
    monitoring conditions of the attached memory;
    determining, in response to the monitoring, whether power consumption of the attached memory exceeds a first preset threshold and whether a temperature of the attached memory exceeds a second preset threshold; and
    generating an alert, in response to determining that the power consumption of the attached memory exceeds the first preset threshold and that the temperature of the attached memory exceeds the second preset threshold.

2. The method of claim 1, wherein the attached memory is a directly attached non-volatile memory storage system.

3. The method of claim 1, wherein the attached memory is a solid state drive.

4. The method of claim 3, wherein:
    the solid state drive is flash memory comprising stacks of die; and
    the method further comprises determining a die count that indicates how many die are simultaneously executing operations.

5. The method of claim 4, wherein:
    a die count limit is a predetermined number of die permitted to actively execute operations simultaneously; and
    the method further comprises determining whether the die count exceeds the die count limit.

6. The method of claim 1, further comprising:
    reducing a number of available credits to a percentage of a number of total system credits in response to determining that the power consumption of the attached memory exceeds the first preset threshold and that the temperature of the attached memory exceeds the second preset threshold, wherein the number of available credits is an amount of credits that is available for assigning to each new operation performed on the attached memory.

7. The method of claim 1, further comprising:
    applying a timing offset to the new operation.

8. The method of claim 7, wherein monitoring conditions of the attached memory comprises monitoring the power consumption of the attached memory.

9. The method of claim 8, further comprising:
    changing the timing offset based on the monitored power consumption.

10. The method of claim 1, further comprising:
    determining whether the power consumption of the attached memory has exceeded the first preset threshold for a predetermined time period; and
    controlling an input/output (I/O) rate of the attached memory based on the determination.

11. The method of claim 10, wherein the I/O rate of the attached memory is decreased responsive to a determination that the power consumption of the attached memory has exceeded the first preset threshold for the predetermined time period.

12. The method of claim 10, wherein the I/O rate of the attached memory is decreased responsive to a determination that the power consumption of the attached memory has exceeded the first preset threshold for the predetermined time period.

13. The method of claim 1, wherein the power is provided directly to the attached memory via a plurality of PCIe interface channels.

14. The method of claim 1,
    wherein monitoring conditions of the attached memory comprises:
        monitoring the power consumption of the attached memory while the attached memory is idle; and
        monitoring the power consumption of the attached memory while the attached memory is executing at least one predetermined operation, and
    wherein the method further comprises:
        determining a power credit for each operation based on a comparison of the power consumption monitored while the attached memory is idle and the power consumption monitored while the attached memory is executing the at least one predetermined operation.

15. The method of claim 1, wherein the new operation is one of a read operation, a write operation, and an erase operation.

16. The method of claim 1, further comprising:
    assigning a total number of system credits for the attached memory;
    assigning one or more credits to the new operation;
    determining whether the one or more credits assigned to credit of the new operation exceed the total number of system credits; and
    executing the new operation based on the determination of whether the one or more credits assigned to the new operation exceed the total number of system credits.

17. The method of claim 16, wherein execution of the new operation is stalled until the one or more credits assigned to the new operation no longer exceed the total number of system credits.

18. A computer program product comprising a series of instructions stored on one or more non-transitory processor readable media which, when executed by a processor, cause the processor to perform operations comprising:
    providing power to a memory attached via a peripheral component interconnect express (PCIe) interface;
    determining whether a new operation to be implemented on the attached memory would cause the power provided to the memory to exceed a preset limit;
    executing the new operation, in response to determining that the new operation would not cause the power to exceed the preset limit;
    monitoring conditions of the attached memory;
    determining, in response to the monitoring, whether power consumption of the attached memory exceeds a first preset threshold and whether a temperature of the attached memory exceeds a second preset threshold; and
    generating an alert, in response to determining that the power consumption of the attached memory exceeds the first preset threshold and that the temperature of the attached memory exceeds the second preset threshold.

19. A system for controlling power on a peripheral component interconnect express (PCIe) interface, the system comprising:

means for providing power to a memory attached via the PCIe interface;

means for determining whether a new operation to be implemented on the attached memory would cause the power provided to the attached memory to exceed a preset limit;

means for executing the new operation, in response to determining that the new operation would not cause the power to exceed the preset limit;

means for monitoring conditions of the attached memory;

means for determining, in response to the monitoring, whether power consumption of the attached memory exceeds a first preset threshold and whether a temperature of the attached memory exceeds a second preset threshold; and means for generating an alert, in response to determining that the power consumption of the attached memory exceeds the first preset threshold and that the temperature of the attached memory exceeds the second preset threshold.

20. The system of claim 19, further comprising: means for determining whether the power consumption of the attached memory has exceeded the first preset threshold for a predetermined time period; and means for controlling an input/output (I/O) rate of the attached memory based on the determining whether the power consumption of the attached memory has exceeded the first preset threshold for the predetermined time period.

* * * * *